United States Patent
Wake et al.

(10) Patent No.: US 9,728,798 B2
(45) Date of Patent: Aug. 8, 2017

(54) FUEL CELL SYSTEM AND CONTROL METHOD FOR THE SAME

(71) Applicant: HONDA MOTOR CO., LTD., Tokyo (JP)

(72) Inventors: Chihiro Wake, Saitama (JP); Tomohisa Kamiyama, Saitama (JP); Masakazu Hamachi, Saitama (JP); Takashi Yamamoto, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 299 days.

(21) Appl. No.: 14/532,528

(22) Filed: Nov. 4, 2014

(65) Prior Publication Data
US 2015/0125767 A1 May 7, 2015

(30) Foreign Application Priority Data

Nov. 5, 2013 (JP) .................. 2013-229708

(51) Int. Cl.
*H01M 8/04291* (2016.01)
*H01M 8/04492* (2016.01)
*H01M 8/04858* (2016.01)
*H01M 8/04828* (2016.01)
*H01M 8/04089* (2016.01)
(Continued)

(52) U.S. Cl.
CPC ....... *H01M 8/04291* (2013.01); *H01M 8/045* (2013.01); *H01M 8/0491* (2013.01); *H01M 8/0494* (2013.01); *H01M 8/04097* (2013.01); *H01M 8/04223* (2013.01); *H01M 8/04253* (2013.01); *H01M 8/04492* (2013.01);
(Continued)

(58) Field of Classification Search
None
See application file for complete search history.

(56) References Cited

U.S. PATENT DOCUMENTS 9,343,762 B2 * 5/2016 Jeon ................. H01M 8/04992
2003/0186093 A1 * 10/2003 St-Pierre ........... H01M 8/04156
429/413
(Continued)

FOREIGN PATENT DOCUMENTS

| JP | 2004-111196 A | 4/2004 |
| JP | 2007-052937 A | 3/2007 |

(Continued)

*Primary Examiner* — Patrick Ryan
*Assistant Examiner* — Carmen Lyles-Irving
(74) *Attorney, Agent, or Firm* — Squire Patton Boggs (US) LLP

(57) ABSTRACT

A fuel cell system includes a fuel cell stack having a membrane electrode assembly and an internal reactant gas passage, a unit that detects or estimates an actual retained water quantity (R.W.Q.), and a power generation control unit having a normal-time mode, a normal-time drying mode and a stop-time drying mode. In the normal-time drying mode, the fuel cell stack is caused to generate electric power while being dried more than in the normal-time mode until the actual R.W.Q. is decreased to a target R.W.Q. In the stop-time drying mode, when the actual R.W.Q. is equal to or more than a flooding threshold at a time of detection of a system stop instruction, the fuel cell stack is caused to generate electric power while being dried more than in the normal-time drying mode until the actual R.W.Q. is decreased to a target R.W.Q.

9 Claims, 10 Drawing Sheets

(51) Int. Cl.
    *H01M 8/04223*    (2016.01)
    *H01M 8/04701*    (2016.01)
    *H01M 8/04746*    (2016.01)

(52) U.S. Cl.
    CPC ... *H01M 8/04731* (2013.01); *H01M 8/04753* (2013.01); *H01M 2250/20* (2013.01); *Y02T 90/32* (2013.01)

(56) References Cited

U.S. PATENT DOCUMENTS

| | | | |
|---|---|---|---|
| 2010/0167144 A1* | 7/2010 | Kaito | H01M 8/10 |
| | | | 429/429 |
| 2010/0291446 A1 | 11/2010 | Aso et al. | |
| 2011/0003215 A1 | 1/2011 | Tanaka et al. | |

FOREIGN PATENT DOCUMENTS

| | | |
|---|---|---|
| JP | 2008-171770 A | 7/2008 |
| JP | 2009-266689 A | 11/2009 |
| JP | 2011-171313 A | 9/2011 |
| WO | 2008/056617 A1 | 5/2008 |
| WO | 2009/060706 A1 | 5/2009 |

* cited by examiner

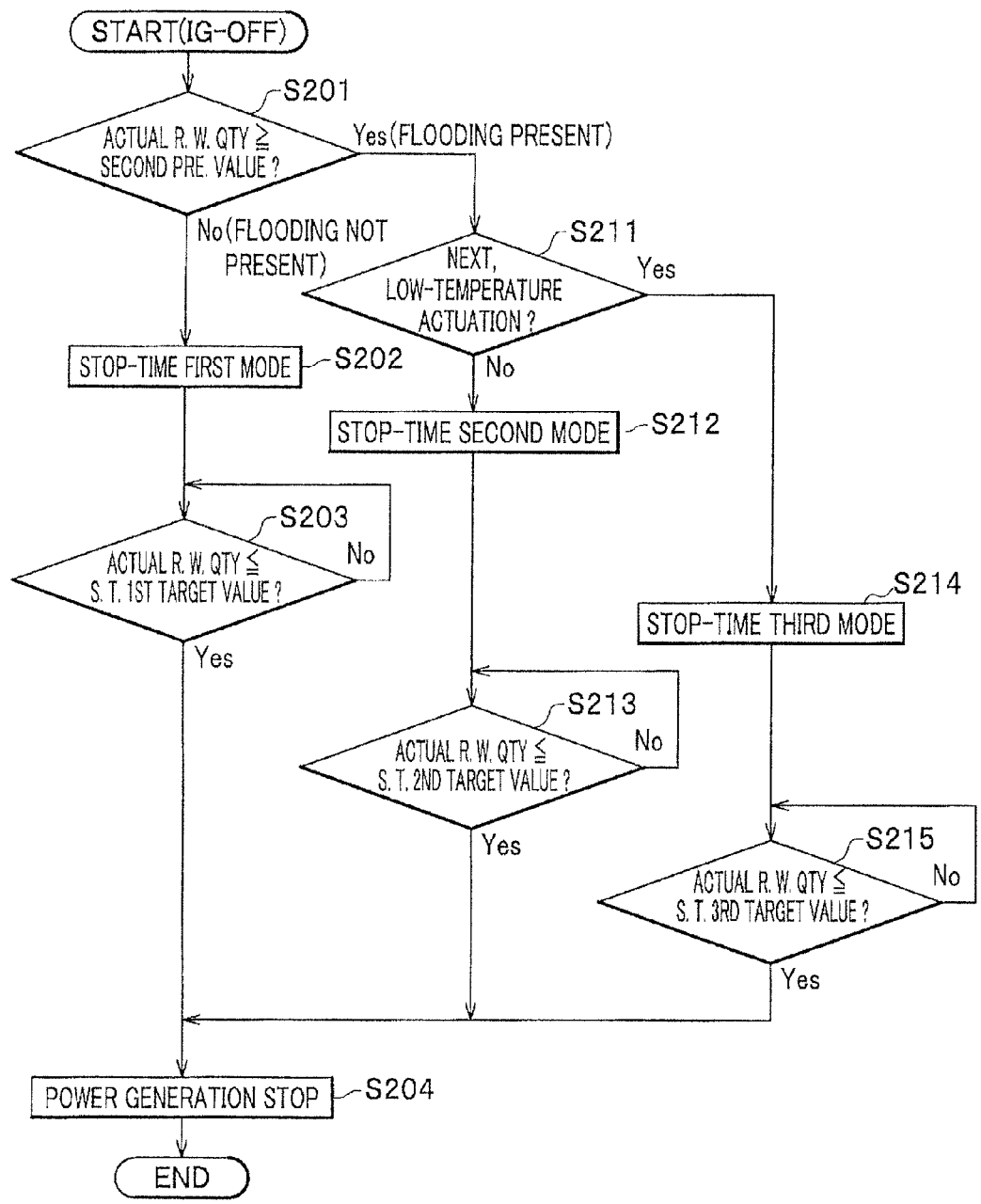

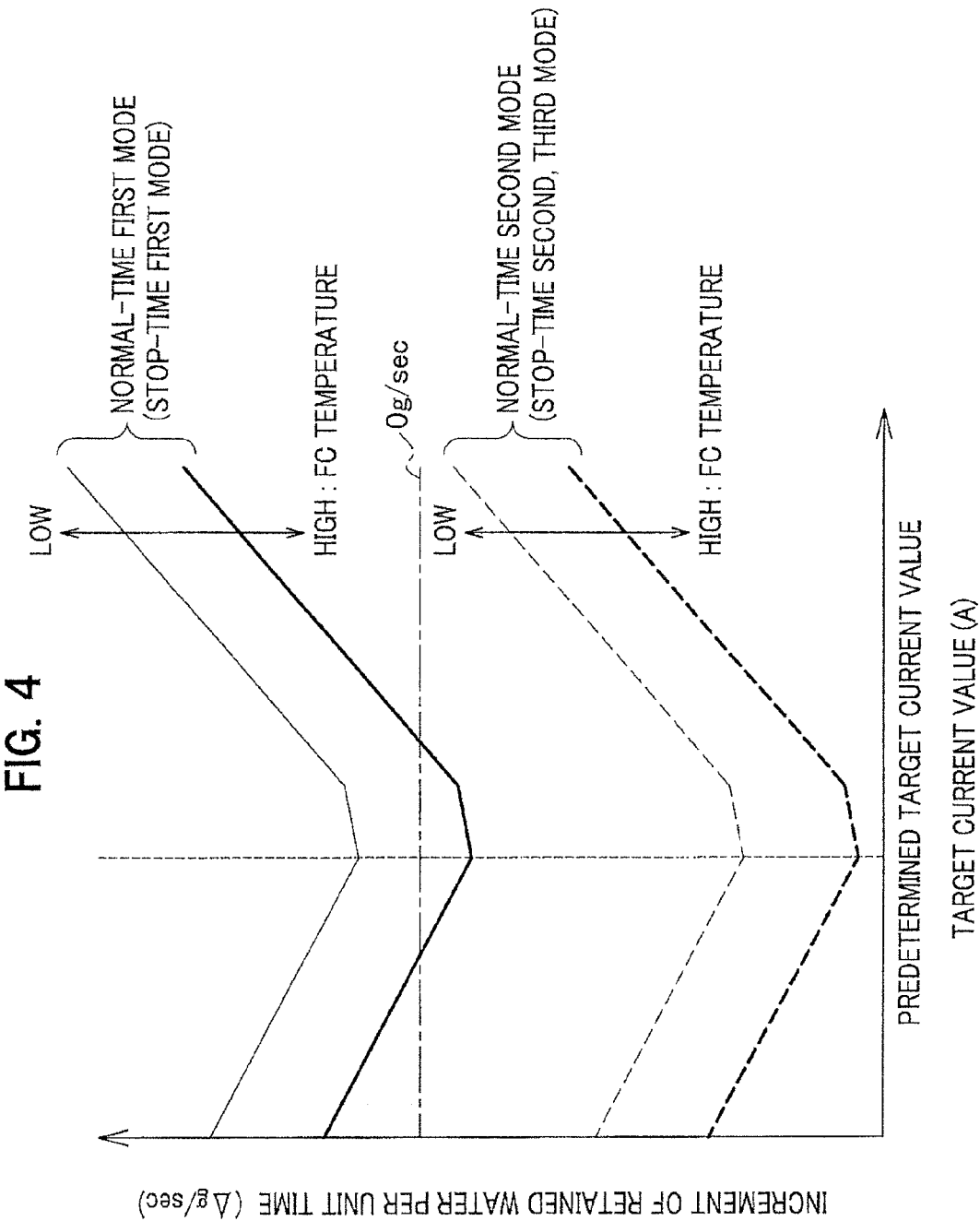

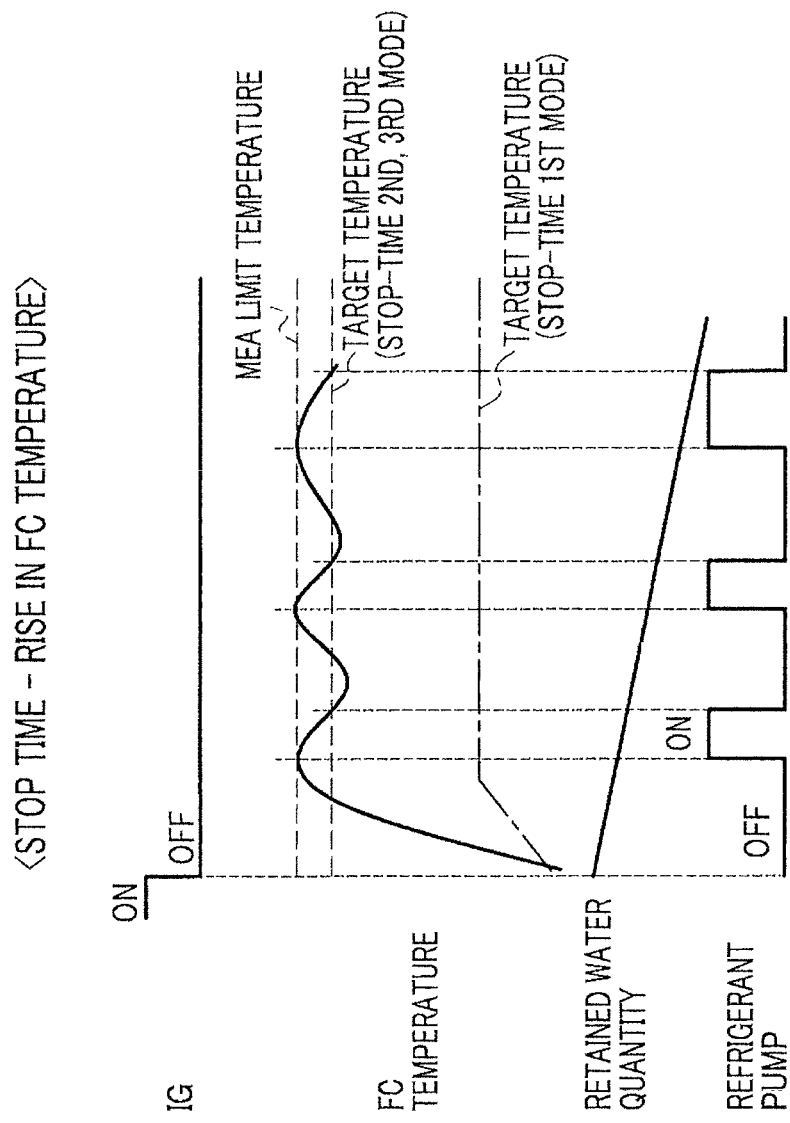

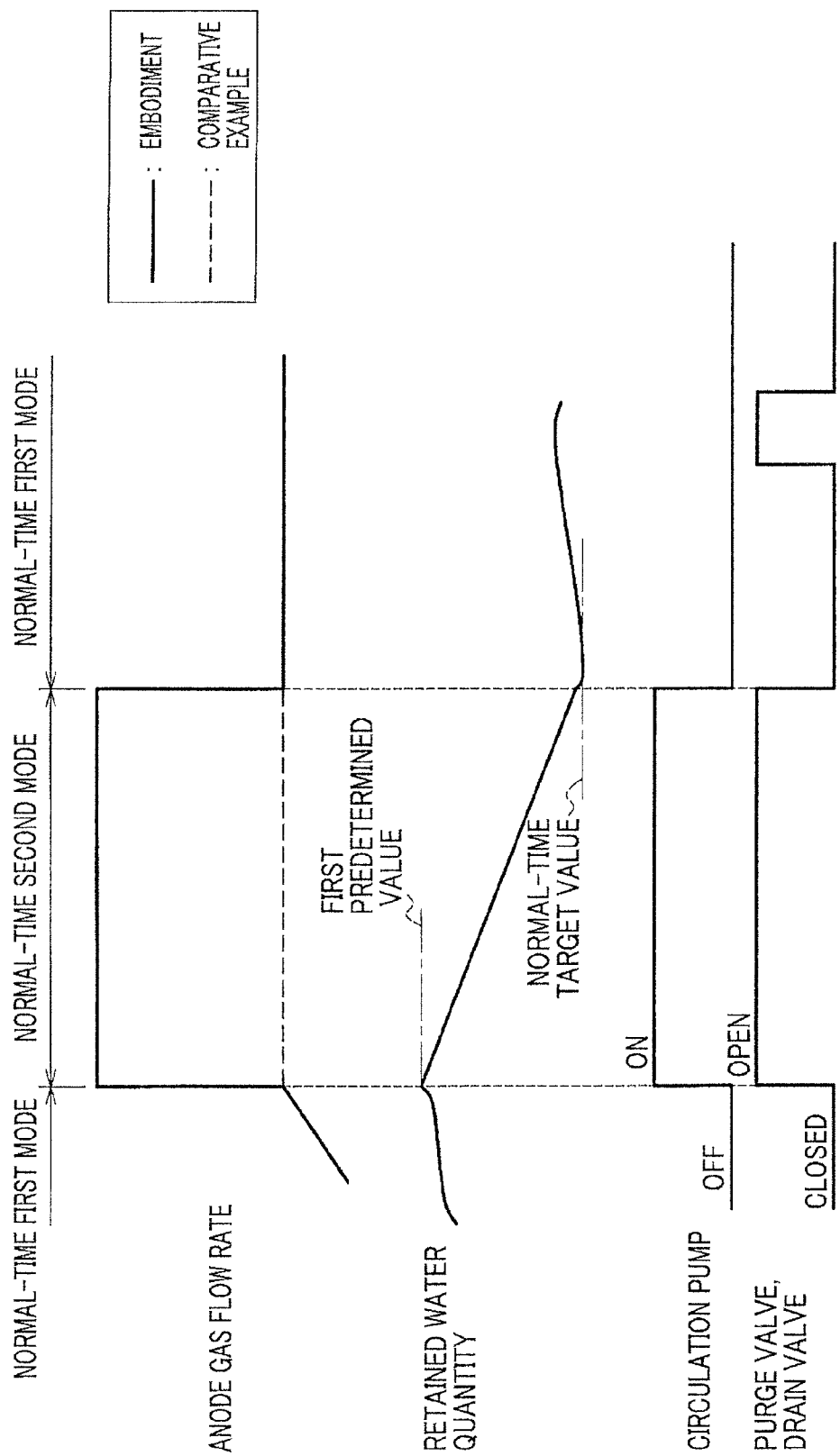

RANGE IN WHICH POWER GENERATION IS POSSIBLE IN IDLE STATE

UPPER LIMIT

RETAINED WATER QUANTITY

TARGET CURRENT VALUE

RETAINED WATER QUANTITY

1min    3min

EXECUTION TIME IN STOP-TIME 2ND, 3RD MODE AFTER IG-OFF

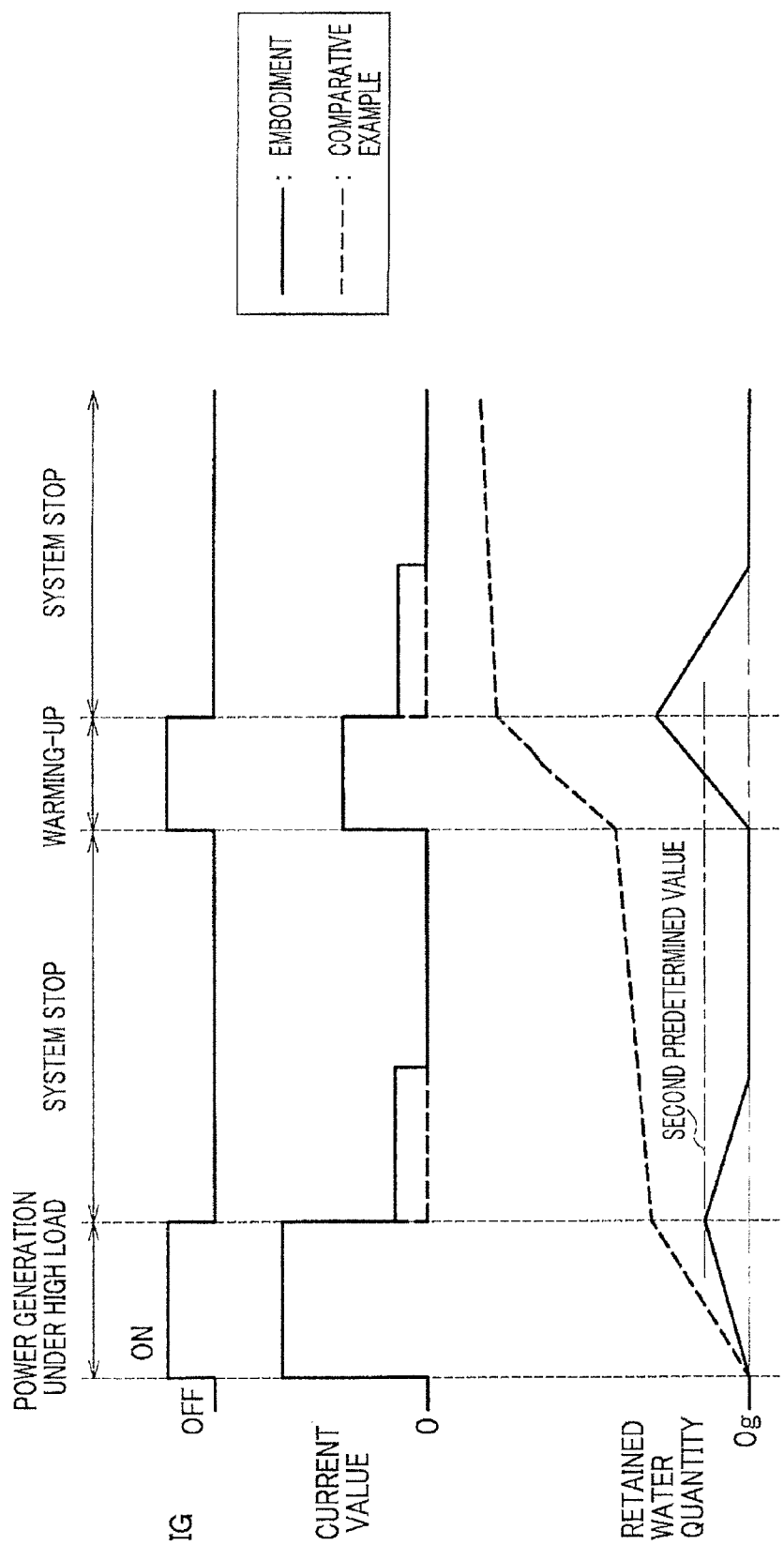

FUEL CELL SYSTEM AND CONTROL METHOD FOR THE SAME

CROSS-REFERENCE TO RELATED APPLICATION

This application is based upon and claims the benefit of priority to the Japanese Patent Application No. 2013-229708, filed on Nov. 5, 2013, the entire contents of which are incorporated herein by reference.

FIELD OF THE INVENTION

The present invention relates to a fuel cell system and a control method for the same.

DESCRIPTION OF RELATED ART

A fuel cell stack in which fuel cells used as a power source in a fuel cell vehicle or the like generate electric power is constituted, for example, by stacking a plurality of single cells. Each single cell includes an MEA (Membrane Electrode Assembly), and an anode separator and a cathode separator which sandwich the MEA therebetween. An internal anode passage is formed in the anode separator, which is in the form of grooves or holes and forms a passage for hydrogen (fuel gas) supplied to and discharged from the anode. In the same manner, an internal cathode passage is formed in the cathode separator, which is in the form of grooves or holes and forms a passage for air (oxidant gas) containing oxygen supplied to and discharged from the cathode.

When such a fuel cell stack generates electric power, water vapor (moisture) is generated in the cathode and portion of the generated water permeates an electrolyte membrane toward the anode side. Moreover, in order to maintain the electrolyte membrane in a moist state, for example, air moving toward the cathode is humidified by a humidifier. Accordingly, the inside of the fuel cell stack is in a humid condition and moisture is retained in the form of gas or liquid in the fuel cell stack, more specifically, in the internal anode passage and the internal cathode passage.

Herein, the moisture retained in the internal anode passage and the internal cathode passage is called retained water. More specifically, retained water in the fuel cell stack (fuel cells) means water which is retained (remains) in the internal anode passage and the internal cathode passage, and water which attaches to the surface of the MEA. In other words, the retained water in the fuel cell stack is water in the fuel cell stack and means water which does not get involved directly in transportation of proton in the electrolyte membrane. Moreover, a state in which water attaching to the surface of the MEA becomes excessive is called a flooding (state). In the flooding state, an excess of retained water makes it difficult for hydrogen and air to be supplied to the MEA and thus decreases an electric power generation performance (output (W)) of the MEA (fuel cell stack).

To cope with this, there has been proposed a technique of discharging retained water when it is determined that the quantity of retained water is equal to or more than a predetermined quantity at a normal time of a fuel cell system (during normal power generation of a fuel cell stack), so as to suppress a decrease in an electric power generation performance due to such a flooding (see Patent Document 1: Japanese Patent Application Publication No. 2007-52937).

However, Patent Document 1 does not take into account retained water at a stop time of the fuel cell system (at a power generation stop time of the fuel cell stack). For example, when a system stop instruction (power generation stop instruction) is detected immediately after power generation under high load, during a warming-up operation or immediately after the warming-up operation, a large quantity of retained water remains retained and thus the fuel cell system is brought into a stopped state. Herein, when the fuel cell stack generates electric power under high load, namely, an output of the fuel cell stack is increased, the quantity of moisture generated with power generation is increased and the retained water is also increased accordingly. Moreover, the warming-up system for the fuel cell stack in this case is, for example, a system that increases the output of the fuel cell stack to increase self-generated heat with the power generation to thereby warm up the fuel cell stack.

In a case where a large quantity of retained water is thus retained, when the system is actuated next time, the large quantity of retained water makes it difficult for hydrogen and air to be supplied to the fuel cell stack and may cause a delay in warming-up of the fuel cell stack. Moreover, in a case where a large quantity of retained water is retained, when an external temperature drops to zero degrees Celsius or lower, the retained water may freeze.

To cope with this, there has been proposed a technique of, after power generation stop of a fuel cell stack, supplying air as a scavenging gas to an internal anode passage, and pushing retained water with the scavenging gas out of the fuel cell stack to scavenge the fuel cell stack (see Patent Document 2: Japanese Patent Application Publication No. 2009-266689).

However, Patent Document 2 poses problems in that a scavenging gas supply unit (device) for supplying a scavenging gas to the internal anode passage is required and thus the system becomes enlarged in size, and that actuation energy (electric power or the like) for the scavenging gas supply unit is required after power generation stop of the fuel cell stack.

It is therefore an object of the present invention to provide a fuel cell system which can decrease retained water in a fuel cell at a normal time and a stop time of the system without enlarging the size of the system, and a control method for the fuel cell system.

SUMMARY OF THE INVENTION

As means for solving the above problems, the present invention provides, as one aspect thereof, a fuel cell system including: a fuel cell that has a membrane electrode assembly which includes an electrolyte membrane, and an internal reactant gas passage through which reactant gas supplied to and discharged from the membrane electrode assembly flows; a retained water quantity grasping unit that detects or estimates an actual retained water quantity which is a current quantity of retained water retained in the internal reactant gas passage; and a power generation control unit that controls power generation of the fuel cell, wherein the power generation control unit has a normal-time mode, a normal-time drying mode, and a stop-time drying mode; the normal-time mode is a mode in which the fuel cell is caused to normally generate electric power in response to a required load; the normal-time drying mode is a mode in which, when the actual retained water quantity is equal to or more than a flooding threshold at which flooding is generated, the fuel cell is caused to generate electric power while being dried more than in the normal-time mode until the actual retained water quantity is decreased to a target retained water quantity; and the stop-time drying mode is a mode in which, when the actual retained water quantity is equal to or more than the flooding threshold at a time of detection of a system stop instruction, the fuel cell is caused to generate electric power while being dried more than in the normal-time drying mode until the actual retained water quantity is decreased to a target retained water quantity.

According to this configuration, when the actual retained water quantity is equal to or more than the flooding threshold, the power generation control unit causes the system to be actuated (operated) in the normal-time drying mode in which the fuel cell is caused to generate electric power while being dried more than in the normal-time mode until the actual retained water quantity is decreased to the target retained water quantity. This causes the actual retained water quantity to be decreased to the target retained water quantity at the normal time. Accordingly, at the normal time, reactant gas can be supplied to an MEA (Membrane Electrode Assembly) without being obstructed by the retained water and thus an electric power generation performance of the MEA is never decreased.

Moreover, when the actual retained water quantity is equal to or more than the flooding threshold at a time of detection of the system stop instruction, the power generation control unit causes the system to be actuated in the stop-time drying mode in which the fuel cell is caused to generate electric power while being dried more than in the normal-time drying mode until the actual retained water quantity is decreased to the target retained water quantity. This causes the actual retained water quantity to be decreased to the target retained water quantity at the stop time. Thus, in the state in which the actual retained water quantity is decreased to the target retained water quantity, power generation of the fuel cell is stopped and the fuel cell and the system are brought into stopped states. Accordingly, the fuel cell becomes hard to freeze during the system stop. Moreover, at a time of next actuation of the system, reactant gas can be supplied to an MEA (Membrane Electrode Assembly) without being obstructed by the retained water and thus an electric power generation performance of the MEA is never decreased.

Furthermore, since the power generation control unit is configured to dry the fuel cell while causing the fuel cell to generate electric power and not configured to dry the fuel cell with a scavenging gas and/or heat of an electric heater, a scavenging gas supply unit for supplying a scavenging gas, an electric heater and the like are not required. This prevents the fuel cell system from being enlarged in size and eliminates the need for actuation energy (electric power or the like) for actuating the scavenging gas supply unit and/or the electric heater.

Moreover, in the above fuel cell system, the power generation control unit may desirably raise a temperature of the fuel cell in the stop-time drying mode to be higher than in the normal-time drying mode.

According to this configuration, since the power generation control unit raises a temperature of the fuel cell in the stop-time drying mode to be higher than in the normal-time drying mode, it is possible to rapidly vaporize the retained water and facilitate drying of the fuel cell.

Moreover, in the above fuel cell system, the power generation control unit may desirably increase a pressure of oxidant gas which flows through the fuel cell in the stop-time drying mode to be higher than in the normal-time drying mode.

According to this configuration, since the power generation control unit increases a pressure of oxidant gas which flows through the fuel cell in the stop-time drying mode to be higher than in the normal-time drying mode, it is possible to rapidly vaporize the retained water while rapidly pushing the retained water out of the internal reactant gas passage, and to facilitate drying of the fuel cell.

Note that the reactant gas is divided broadly into fuel gas such as hydrogen and oxidant gas such as air containing oxygen. Moreover, the internal reactant gas passage is divided broadly into an internal fuel gas passage through which the fuel gas flows, and an internal oxidant gas passage through which the oxidant gas flows.

Moreover, in the above fuel cell system, the power generation control unit may desirably increase a flow rate of oxidant gas which flows through the fuel cell in the stop-time drying mode to be higher than in the normal-time drying mode.

According to this configuration, since the power generation control unit increases a flow rate of oxidant gas which flows through the fuel cell in the stop-time drying mode to be higher than in the normal-time drying mode, it is possible to rapidly vaporize the retained water while rapidly pushing the retained water out of the internal reactant gas passage, and to facilitate drying of the fuel cell.

Moreover, in the above fuel cell system, the system may further include a fuel gas circulation passage which allows fuel gas discharged from the fuel cell to circulate therethrough; and a circulation quantity control unit that controls circulation quantity of the fuel gas circulating through the fuel gas circulation passage, and the power generation control unit may desirably cause the circulation quantity control unit to increase circulation quantity of the fuel gas in the normal-time drying mode and the stop-time drying mode.

According to this configuration, since the power generation control unit causes the circulation quantity control unit to increase circulation quantity of the fuel gas in the normal-time drying mode and the stop-time drying mode, the circulating fuel gas flows through the internal fuel gas passage in the fuel cell. This makes it possible for the circulating fuel gas to push out retained water which is retained in the internal fuel gas passage, and to facilitate drying of the fuel cell.

Moreover, in the above fuel cell system, the power generation control unit may desirably increase a flow rate of fuel gas which flows through the fuel cell in the normal-time drying mode and the stop-time drying mode.

According to this configuration, since the power generation control unit increases a flow rate of fuel gas which flows through the fuel cell in the normal-time drying mode and the stop-time drying mode, it is possible to push out retained water which is retained in the internal fuel gas passage, and to facilitate drying of the fuel cell.

Moreover, in the above fuel cell system, the power generation control unit may desirably set a current value of the fuel cell in the stop-time drying mode to a stop-time current value, the stop-time current being consumable in a stopped state of a vehicle.

According to this configuration, in the stop-time drying mode after detection of a system stop instruction, the current value of the fuel cell is set to the stop-time current value, the stop-time current being consumable in a stopped state of a vehicle. This causes electric power generated by the fuel cell to be consumed by an electric power consumption equipment and thus the stopped state (state in which a vehicle speed is zero) of the vehicle (fuel cell vehicle) is maintained. Herein, the electric power consumption equipment includes auxiliaries that constitute the fuel cell system, for example, a compressor which discharges air (reactant gas), and a battery (electric storage device) which charges and discharges electric power. Namely, that electric power generated by the fuel cell is consumed by the electric power consumption equipment includes a form in which electric power generated by the fuel cell is charged into (absorbed by) the battery.

In this case, when the stop-time current value is set to the maximum value (upper limit) of a current which is consumable in the stopped state of the vehicle, self-generated heat of the fuel cell associated with the power generation is increased, thereby making it possible to facilitate drying of the fuel cell and finish the system stop processing early.

Moreover, in the above fuel cell system, a target moisture quantity in the stop-time drying mode may desirably be smaller than a target moisture quantity in the normal-time drying mode.

According to this configuration, since the target moisture quantity in the stop-time drying mode is smaller than the target moisture quantity in the normal-time drying mode, retained water during the system stop becomes smaller than in the normal-time drying mode. This makes dew condensation water hard to be generated during the system stop and makes it possible to prevent deterioration in the electrolyte membrane and the like.

In other words, since the target moisture quantity in the normal-time drying mode is larger than the target moisture quantity in the stop-time drying mode, actuation time in the normal-time drying mode is shorter than in the stop-time drying mode, thereby making it possible to decrease energy required for actuation in the normal-time drying mode to be smaller than in the stop-time drying mode.

Moreover, in the above fuel cell system, a target moisture quantity when predicting that a next actuation of the system is a low-temperature actuation in a case of detecting a system stop instruction may desirably be smaller than a target moisture quantity when predicting that a next actuation of the system is not a low-temperature actuation.

According to this configuration, since a target moisture quantity when predicting that a next actuation of the system is a low-temperature actuation in a case of detecting a system stop instruction is smaller than a target moisture quantity when predicting that a next actuation of the system is not a low-temperature actuation, retained water in a case of predicting that a next actuation of the system is a low-temperature actuation becomes smaller in quantity. This makes the retained water hard to freeze during the system stop and makes it possible to prevent deterioration in the MEA.

Moreover, in the above fuel cell system, the system may further include an anode system that includes a fuel gas storage unit in which fuel gas is stored, a fuel gas supply passage through which fuel gas flows from the fuel gas storage unit toward the fuel cell, a fuel gas discharge passage through which fuel gas from the fuel cell flows, a fuel gas circulation passage which connects the fuel gas supply passage and the fuel gas discharge passage to each other and allows fuel gas to circulate therethrough, and a discharge valve which discharges gas in the fuel gas discharge passage to an outside of the system, and the retained water quantity grasping unit may desirably detect or estimate a quantity of anode system retained water retained in the anode system, and when a determination that a large quantity of water is retained in the anode system is made based on the quantity of anode system retained water, the power generation control unit may desirably execute the normal-time drying mode or the stop-time drying mode.

According to this configuration, since when a determination that a large quantity of water is retained in the anode system is made, the power generation control unit executes the normal-time drying mode or the stop-time drying mode, the discharge valve becomes hard to freeze. Moreover, since a large quantity of water does not remain existing in the anode system during the system stop, the fuel cell system can be started up early.

Moreover, according to another aspect of the present invention, there is provided a control method for a fuel cell system equipped with: a fuel cell that has a membrane electrode assembly which includes an electrolyte membrane, and an internal reactant gas passage through which reactant gas supplied to and discharged from the membrane electrode assembly flows; a retained water quantity grasping unit that detects or estimates an actual retained water quantity which is a current quantity of retained water retained in the internal reactant gas passage; and a power generation control unit that controls power generation of the fuel cell, the control method comprising: a step of, when the actual retained water quantity is equal to or more than a flooding threshold, by means of the power generation control unit, causing the system to be actuated in a normal-time drying mode in which the fuel cell is caused to generate electric power while being dried more than in a normal-time mode in which the fuel cell is caused to normally generate electric power in response to a required load, until the actual retained water quantity is decreased to a target retained water quantity; and a step of, when the actual retained water quantity is equal to or more than the flooding threshold at a time of detection of a system stop instruction, by means of the power generation control unit, causing the system to be actuated in a stop-time drying mode in which the fuel cell is caused to generate electric power while being dried more than in the normal-time drying mode until the actual retained water quantity is decreased to a target retained water quantity.

Moreover, in the above control method for a fuel cell system, the control method may further include a step of, by means of the power generation control unit, raising a temperature of the fuel cell in the stop-time drying mode to be higher than in the normal-time drying mode.

Moreover, in the above control method for a fuel cell system, the control method may further include a step of, by means of the power generation control unit, increasing a pressure of oxidant gas which flows through the fuel cell in the stop-time drying mode to be higher than in the normal-time drying mode.

Moreover, in the above control method for a fuel cell system, the control method may further include a step of, by means of the power generation control unit, increasing a flow rate of oxidant gas which flows through the fuel cell in the stop-time drying mode to be higher than in the normal-time drying mode.

Moreover, in the above control method for a fuel cell system, the fuel cell system may further include a fuel gas circulation passage which allows fuel gas discharged from the fuel cell to circulate therethrough, and a circulation quantity control unit that controls circulation quantity of the fuel gas circulating through the fuel gas circulation passage, and the control method may further include a step of, by means of the power generation control unit, causing the circulation quantity control unit to increase circulation quantity of the fuel gas in the normal-time drying mode and the stop-time drying mode.

Moreover, in the above control method for a fuel cell system, the control method may further include a step of, by means of the power generation control unit, increasing a flow rate of fuel gas which flows through the fuel cell in the normal-time drying mode and the stop-time drying mode.

Moreover, in the above control method for a fuel cell system, the control method may further include a step of, by means of the power generation control unit, setting a current value of the fuel cell in the stop-time drying mode to a stop-time current value, the stop-time current being consumable in a stopped state of a vehicle.

Moreover, in the above control method for a fuel cell system, a target moisture quantity in the stop-time drying mode may be smaller than a target moisture quantity in the normal-time drying mode.

Moreover, in the above control method for a fuel cell system, a target moisture quantity when predicting that a next actuation of the system is a low-temperature actuation in a case of detecting a system stop instruction may be smaller than a target moisture quantity when predicting that a next actuation of the system is not a low-temperature actuation.

Moreover, in the above control method for a fuel cell system, the fuel cell system may further include an anode system that includes a fuel gas storage unit in which fuel gas is stored, a fuel gas supply passage through which fuel gas flows from the fuel gas storage unit toward the fuel cell, a fuel gas discharge passage through which fuel gas from the fuel cell flows, a fuel gas circulation passage which connects the fuel gas supply passage and the fuel gas discharge passage to each other and allows fuel gas to circulate therethrough, and a discharge valve which discharges gas in the fuel gas discharge passage to an outside of the system, and the control method may further include a step of, by means of the retained water quantity grasping unit, detecting or estimating a quantity of anode system retained water retained in the anode system; and a step of, when a determination that a large quantity of water is retained in the anode system is made based on the quantity of anode system retained water, by means of the power generation control unit, executing the normal-time drying mode or the stop-time drying mode.

According to the present invention, it is possible to provide a fuel cell system which decreases retained water in a fuel cell at a normal time and a stop time of the system without enlarging the size of the system, and a control method for the fuel cell system.

BRIEF DESCRIPTION OF THE DRAWINGS

FIG. 3 is a flowchart representing a stop-time operation of the fuel cell system according to the present embodiment.

FIG. 4 is a map showing a relationship between a target current value and an increment of retained water per unit time.

FIGS. 5A and 5B are timing charts showing examples of operation of the fuel cell system according to the present embodiment, in which FIG. 5A shows an example of normal-time operation and FIG. 5B shows an example of stop-time operation.

FIG. 6 is a timing chart showing an example of normal-time operation of the fuel cell system according to the present embodiment.

FIG. 9 is a timing chart showing an example of operation of the fuel cell system according to the present embodiment.

DETAILED DESCRIPTION OF THE EMBODIMENT

An embodiment of the present invention will be described with reference to FIGS. 1 to 9.

<<Configuration of Fuel Cell System>>

Figure 1:
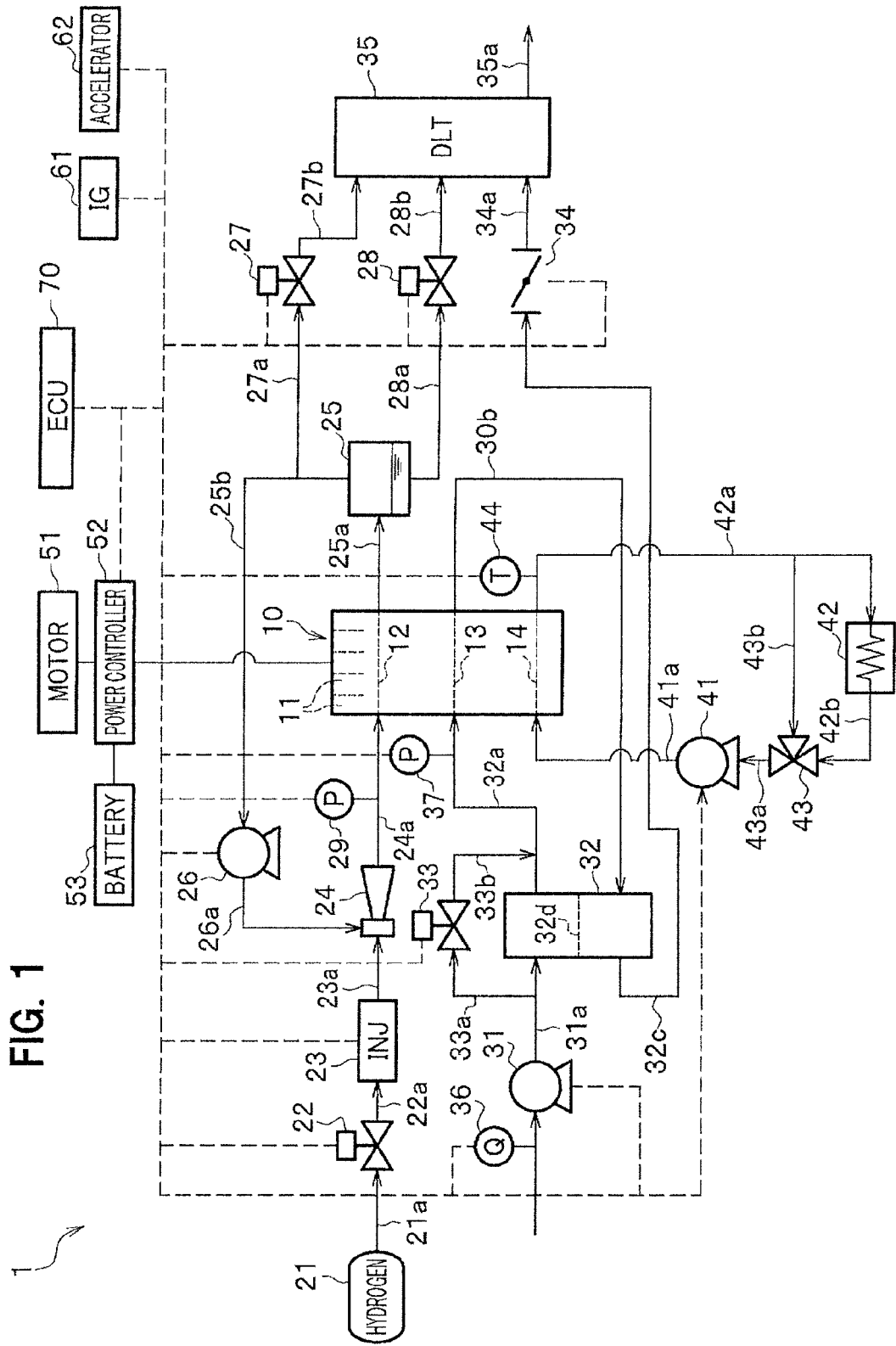
FIG. 1 is a diagram illustrating a configuration of a fuel cell system according to an embodiment of the present invention.

A fuel cell system 1 according to the present embodiment illustrated in FIG. 1 is mounted on a fuel cell vehicle (mobile object) not shown. The fuel cell system 1 is equipped with a fuel cell stack 10, an anode system that supplies and discharges hydrogen (fuel gas, reactant gas) to and from anodes of the fuel cell stack 10, a cathode system that supplies and discharges air (oxidant gas, reactant gas) containing oxygen to and from cathodes of the fuel cell stack 10, a refrigerant system that allows refrigerant to circulate by way of the fuel cell stack 10, an electric power consumption system that consumes electric power (output) generated by the fuel cell stack 10, and an ECU (Electronic Control Unit) 70 that electronically controls these systems and parts to control the fuel cell system 1.

<Fuel Cell Stack>

The fuel cell stack 10 is a stack constituted by stacking a plurality (for example, 200 to 400 sheets) of solid polymer type single cells 11, and the plurality of single cells 11 are electrically connected in series with one another. Each single cell 11 includes an MEA (Membrane Electrode Assembly), and two sheets of an anode separator and a cathode separator which have conductive property and sandwich the MEA therebetween.

The MEA includes an electrolyte membrane (solid polymer membrane) consisting of a monovalent cation exchange membrane (e.g., of a perfluorosulfonic acid type), and an anode and a cathode sandwiching therebetween the electrolyte membrane.

Since the electrolyte membrane exhibits moisture permeability, for example, when retained water in an internal anode passage 12 decreases, retained water in an internal cathode passage 13 permeates the electrolyte membrane to flow toward the internal anode passage 12. More specifically, removal of retained water in one of the internal anode passage 12 and the internal cathode passage 13 leads to removal of retained water in the other thereof.

The anode and the cathode are primarily composed of a conductive porous member such as a carbon paper, and carry thereon catalysts (Pt, Ru or the like) for causing electrode reactions in the anode and the cathode.

Formed in the anode separator are through-holes (referred to as an internal manifold) which extend in the lamination direction of the single cells 11, and/or grooves which extend in the surface direction of the single cells 11, in order to supply and discharge hydrogen to and from the anode of each MEA. These through-holes and grooves function as the internal anode passage 12 (internal fuel gas passage, internal reactant gas passage).

Formed in the cathode separator are through-holes (referred to as an internal manifold) which extend in the lamination direction of the single cells 11, and/or grooves which extend in the surface direction of the single cells 11, in order to supply and discharge air to and from the cathode of each MEA. These through-holes and grooves function as the internal cathode passage 13 (oxidant gas passage).

When hydrogen is supplied via the internal anode passage 12 to each anode, an electrode reaction as indicated by Expression (1) is caused, and when air is supplied via the internal cathode passage 13 to each cathode, an electrode reaction as indicated by Expression (2) is caused. This results in generation of an electric potential difference (Open Circuit Voltage (OCV)) in each single cell 11. Then, when the fuel cell stack 10 and an external circuit such as a traveling motor are electrically connected to each other to take out current, the fuel cell stack 10 generates electric power.

$$2H_2 \rightarrow 4H^+ + 4e^- \qquad (1)$$

$$O_2 + 4H^+ + 4e^- \rightarrow 2H_2O \qquad (2)$$

When the fuel cell stack 10 thus generates electric power, portion of moisture (water vapor) generated in the cathode permeates the electrolyte membrane to move toward the anode. Accordingly, anode off-gas discharged from the anode and cathode off-gas discharged from the cathode become humid. Moreover, air to be supplied to the cathode is humidified by a humidifier 32 as described later and thus becomes humid.

Herein, when moisture attaches to the surface of the MEA to form a water film, hydrogen and air cannot very well reach the catalysts carried on the anode and the cathode and thus IV (current-voltage) performance of the fuel cell stack 10 tends to decrease.

Moreover, formed in the anode separator and the cathode separator are grooves and/or holes through which refrigerant for cooling each single cell 11 flows. These grooves and/or holes constitute a refrigerant passage 14.

<Anode System>

The anode system includes a hydrogen tank 21 (fuel gas storage unit), a normally-closed type shutoff valve 22, an injector 23 (circulation quantity control unit), an ejector 24, a gas-liquid separator 25, a circulation pump 26 (circulation quantity control unit), a normally-closed type purge valve 27, a normally-closed type drain valve 28, and a pressure sensor 29.

The hydrogen tank 21 is a container in which hydrogen is stored under high pressure. The hydrogen tank 21 is connected via a pipe 21a, the shutoff valve 22, a pipe 22a, the injector 23, a pipe 23a, the ejector 24 and a pipe 24a to an inlet of the internal anode passage 12. When the ECU 70 causes the shutoff valve 22 to be opened and causes the injector 23 to inject (discharge) hydrogen, hydrogen in the hydrogen tank 21 is supplied through the pipe 21a and the like to the internal anode passage 12.

That is, the pipe 21a, the pipe 22a, the pipe 23a and the pipe 24a constitute a fuel gas supply passage through which hydrogen flows from the hydrogen tank 21 toward the internal anode passage 12.

The shutoff valve 22 is, for example, an electromagnetic opening/closing valve that opens and closes in response to an instruction from the ECU 70. The purge valve 27, the drain valve 28, and a bypass valve 33 as described later, also have the same configuration.

The injector 23 is an electronically-controlled hydrogen injection device in which a needle is driven back and forth by means of PWM control of the ECU 70, to thereby intermittently inject new hydrogen from the hydrogen tank 21, from its nozzle. Thus the injector 23 is adapted to inject hydrogen to control a pressure and a flow rate of hydrogen that flows through the internal anode passage 12. For example, with an increase in length of ON time (injection time of hydrogen, ON duty) in a predetermined interval in the injector 23, the pressure of hydrogen becomes high and the flow rate of hydrogen is increased.

Moreover, the injector 23 (circulation quantity control unit) is adapted to vary injection quantity of hydrogen to thereby vary a negative pressure in the ejector 24. When the negative pressure is thus varied, the quantity of anode off-gas to be suctioned by the negative pressure, namely, circulation quantity of hydrogen circulating through a fuel gas circulation passage (pipe 25a and the like), can be controlled. More specifically, when the injection quantity of hydrogen from the injector 23 is increased, the negative pressure becomes high and the circulation quantity of hydrogen is increased.

The ejector 24 is adapted to generate a negative pressure by injecting new hydrogen from the injector 23, with its nozzle, suction anode off-gas in a pipe 26a by the negative pressure, mix the new hydrogen with the anode off-gas, and inject the mixed gas into the internal anode passage 12.

An outlet of the internal anode passage 12 is connected via the pipe 25a, the gas-liquid separator 25, a pipe 25b, the circulation pump 26 and the pipe 26a to an inlet of the ejector 24. Accordingly, anode off-gas containing hydrogen from the internal anode passage 12 is taken in the ejector 24 through the pipe 25a and the like. This allows hydrogen to circulate by way of the internal anode passage 12.

That is, the fuel gas circulation passage through which hydrogen discharged from the internal anode passage 12 is allowed to circulate is constituted by the pipe 25a, the pipe 25b and the pipe 26a. Namely, the fuel gas circulation passage connects the fuel gas supply passage (pipe 23a and the like) with a fuel gas discharge passage (pipe 27a and the like). Note that the fuel gas discharge passage through which hydrogen (fuel gas) from the internal anode passage 12 flows is constituted by the pipe 25a, a portion of the pipe 25b, the pipe 27a and a pipe 27b.

The gas-liquid separator 25 is adapted to recover and separate off water in the form of liquid contained in the anode off-gas. The recovered and separated-off water is temporarily stored in a tank part comprised of a bottom portion of the gas-liquid separator 25.

The tank part is connected via a pipe 28a, the drain valve 28 and a pipe 28b to a diluter (DLT) 35. Accordingly, when the ECU 70 causes the drain valve 28 to be opened, water in the gas-liquid separator 25 is discharged through the pipe 28a and the like to the diluter 35.

The circulation pump 26 is a pump that is provided in the fuel gas circulation passage (pipe 25a and the like) described above and operates in response to an instruction from the ECU 70 to thereby pump the anode off-gas and controls the circulation quantity of hydrogen. When a rotational speed of the circulation pump 26 is increased, a discharge pressure of the anode off-gas from the circulation pump 26 becomes high and a discharge quantity thereof becomes increased, thereby increasing the circulation quantity of hydrogen which circulates through the fuel gas circulation passage (pipe 25a and the like).

An intermediate portion of the pipe 25b is connected via the pipe 27a, the purge valve 27 and the pipe 27b to the diluter 35. The purge valve 27 is set to be opened by the ECU 70, at a time of start-up of the system or at a time of power generation of the fuel cell stack 10, when discharging (purging) impurities (water vapor, nitrogen, etc.) accompanying hydrogen which circulate through the pipe 25b. Namely, the purge valve 27 is a discharge valve which discharges gas in the pipe 27a (fuel gas discharge passage) to the outside.

Note that the ECU 70 is set to determine that the impurities need to be discharged and open the purge valve 27, for example, when a voltage (cell voltage) of the single cell 11 constituting the fuel cell stack 10 becomes equal to or lower than a predetermined cell voltage. The cell voltage is detected, for example, through a voltage sensor (cell voltage monitor) which detects a voltage of the single cell 11.

The pressure sensor 29 is attached to the pipe 24a so as to be able to detect the pressure of hydrogen (actual anode pressure) in the internal anode passage 12. The pressure sensor 29 is adapted to output the detected actual anode pressure to the ECU 70. Note that the arrangement of the pressure sensor 29 is not limited to this embodiment and may be provided, for example, on the pipe 25a.

<Cathode System>

The cathode system includes a compressor 31 (oxidant gas supply unit), a humidifier 32, a normally-closed type bypass valve 33, a normally-open type back-pressure valve 34, the diluter 35, a flow rate sensor 36, and a pressure sensor 37.

The compressor 31 is connected via a pipe 31a, the humidifier 32 and a pipe 32a to an inlet of the internal cathode passage 13. When the compressor 31 operates in response to an instruction from the ECU 70, air containing oxygen from the outside of the vehicle is taken in and compressed by the compressor 31, and then supplied through the pipe 31a and the like to the internal cathode passage 13.

The humidifier 32 is adapted to humidify the air to be supplied to the internal cathode passage 13. Specifically, the humidifier 32 includes a hollow fiber membrane 32d which can exchange moisture, and causes the hollow fiber membrane 32d to exchange moisture between the air and the cathode off-gas.

The pipe 31a is connected via a pipe 33a, the bypass valve 33 and a pipe 33b to the pipe 32a. When the ECU 70 causes the bypass valve 33 to be opened, new air flows through the pipe 33a and the like and bypasses the humidifier 32.

An outlet of the internal cathode passage 13 is connected via a pipe 30b, the humidifier 32, a pipe 32c, the back pressure valve 34 and a pipe 34a to the diluter 35. Accordingly, cathode off-gas from the internal cathode passage 13 is supplied through the pipe 32b and the like to the diluter 35.

The back-pressure valve 34 is a normally-open type valve composed of a butterfly valve or the like, and an opening degree thereof is controlled by the ECU 70. Specifically, when the opening degree of the back-pressure valve 34 is made small, the pressure of air (actual cathode pressure) in the internal cathode passage 13 becomes high.

The diluter 35 is a container in which the anode off-gas introduced through the purge valve 27 is mixed with the cathode off-gas (diluting gas) introduced through the pipe 34a and hydrogen contained in the anode off-gas is diluted with the cathode off-gas, and includes a dilution space inside the diluter 35. A diluted gas generated by mixing the anode off-gas with the cathode off-gas is discharged via a pipe 35a to the outside of the vehicle.

The flow rate sensor 36 is a sensor that detects a mass flow rate (g/s), and is attached to the vicinity of an inlet of the compressor 31. The flow rate sensor 36 is adapted to output the detected mass flow rate to the ECU 70.

The pressure sensor 37 is attached to the pipe 32a so as to be able to detect the pressure of air (actual cathode pressure) in the internal cathode passage 13. The pressure sensor 37 is adapted to output the detected actual cathode pressure to the ECU 70. Note that the arrangement of the pressure sensor 37 is not limited to this embodiment and may be provided, for example, on the pipe 30b.

<Refrigerant System>

The refrigerant system includes a refrigerant pump 41, a radiator 42 (heat radiator), and a thermostat 43.

A discharge port of the refrigerant pump 41 is connected via a pipe 41a to an inlet of the refrigerant passage 14. An outlet of the refrigerant passage 14 is connected via a pipe 42a, the radiator 42, a pipe 42b, the thermostat 43 and a pipe 43a to a suction port of the refrigerant pump 41. When the refrigerant pump 41 operates in response to an instruction from the ECU 70, the refrigerant circulates by way of the refrigerant passage 14 and the radiator 42, thereby appropriately cooling the fuel cell stack 10.

An intermediate portion of the pipe 42a is connected via a pipe 43b to the thermostat 43. When a temperature of the refrigerant is low at a time of low-temperature actuation or the like, the cool temperature refrigerant flows through the pipe 43b toward the thermostat 43 and bypasses the radiator 42, thereby warming up the fuel cell stack 10 early. Namely, the thermostat 43 (direction switching valve) is adapted to switch the direction of flow of the refrigerant in response to the temperature of the refrigerant.

<Electric Power Consumption System>

The electric power consumption system includes a motor 51, an electric power controller 52, and a battery 53.

The motor 51 is connected via the electric power controller 52 to output terminals (not shown) of the fuel cell stack 10. The battery 53 is connected to the electric power controller 52. Note that an inverter (PDU: Power Drive Unit) is provided between the motor 51 and the electric power controller 52, and a contactor (ON/OFF switch) is provided between the electric power controller 52 and the fuel cell stack 10.

The motor 51 is an external load and is a power source that generates a driving force of the fuel cell vehicle.

The electric power controller 52 is a device that controls an electric power (output current, output voltage) generated by the fuel cell stack 10 and charge/discharge of the battery 53 in response to an instruction from the ECU 70, and includes an electronic circuit such as a DC/DC chopper.

The battery 53 is composed of an assembled battery which is a combination of a plurality of single batteries. Each single battery is, for example, a lithium ion battery.

<Other Devices>

An IG (ignition) 61 is a start-up switch for the fuel cell vehicle (fuel cell system 1), and is arranged in the vicinity of the driver's seat. The IG 61 is connected to the ECU 70, and the ECU 70 is adapted to detect an ON signal or an OFF signal of the IG 61.

The accelerator opening degree sensor 62 is adapted to detect an accelerator opening degree (depression quantity of an accelerator pedal) to output the same to the ECU 70.

<ECU>

The ECU 70 is a control device that electronically controls the fuel cell system 1, which is configured including a CPU, a ROM, a RAM, various interfaces, electronic circuits and the like. The ECU 70 is adapted to control various devices and execute various kinds of processing according to programs stored therein.

<ECU-Retained Water Quantity Calculating Function>

The ECU 70 (retained water quantity grasping unit) has a function of calculating (estimating) a current quantity of retained water (actual retained water quantity) contained in the fuel cell stack 10. The retained water contained in the fuel cell stack 10 contains retained water which is retained in the internal anode passage 12, and retained water which is retained in the internal cathode passage 13.

More specifically, the ECU 70 is adapted to calculate an increment of retained water per unit time (Δg/sec) based on a target current value and the map of FIG. 4, and integrate the calculated increment with respect to time to thereby calculate (estimate) the current quantity of retained water contained in the fuel cell stack 10. In FIG. 4, the fact that the increment of retained water is larger than zero and is positive means that the retained water is increased, and the fact that the increment of retained water is smaller than zero and is negative means that the retained water is decreased.

As shown in FIG. 4, the range in which the target current value is equal to or less than a predetermined target current value exhibits a relationship in which, with an increase in the target current value, the increment of retained water becomes small. This is because, with an increase in the target current value, the flow rates of hydrogen and air flowing through the fuel cell stack 10 are increased and the quantity of retained water pushed by hydrogen and air out of the fuel cell stack 10 becomes larger than the quantity of generated water generated with the power generation.

The range in which the target current value is equal to or more than the predetermined target current value exhibits a relationship in which, with an increase in the target current value, the increment of retained water becomes large. This is because, with an increase in the target current value, the quantity of generated water generated with the power generation becomes larger than the quantity of retained water pushed out of the fuel cell stack 10.

All of the modes including a normal-time first mode and the like exhibit a relationship in which when a temperature of the fuel cell stack 10 decreases, the increment of retained water becomes large. This is because, with a decrease in the temperature of the fuel cell stack 10, a temperature of moisture decreases to make dew condensation water easy to be generated.

The increment of retained water in a drying power generation mode (normal-time second mode, stop-time second mode, stop-time third mode) becomes smaller than the increment of retained water in the normal-time first mode (stop-time first mode). This is because drying of the fuel cell stack 10 is facilitated in the drying power generation mode more than in the normal-time first mode. Note that the drying power generation mode collectively means the normal-time second mode, the stop-time second mode and the stop-time third mode. Since the fuel cell stack 10 becomes easy to be dried according to the order of the normal-time second mode, the stop-time second mode and the stop-time third mode, the increment of retained water may be set to be small accordingly.

<ECU-Flooding Determining Function>

The ECU 70 (flooding determining unit) has a function of determining whether or not flooding is currently generated in the fuel cell stack 10.

Figure 2:
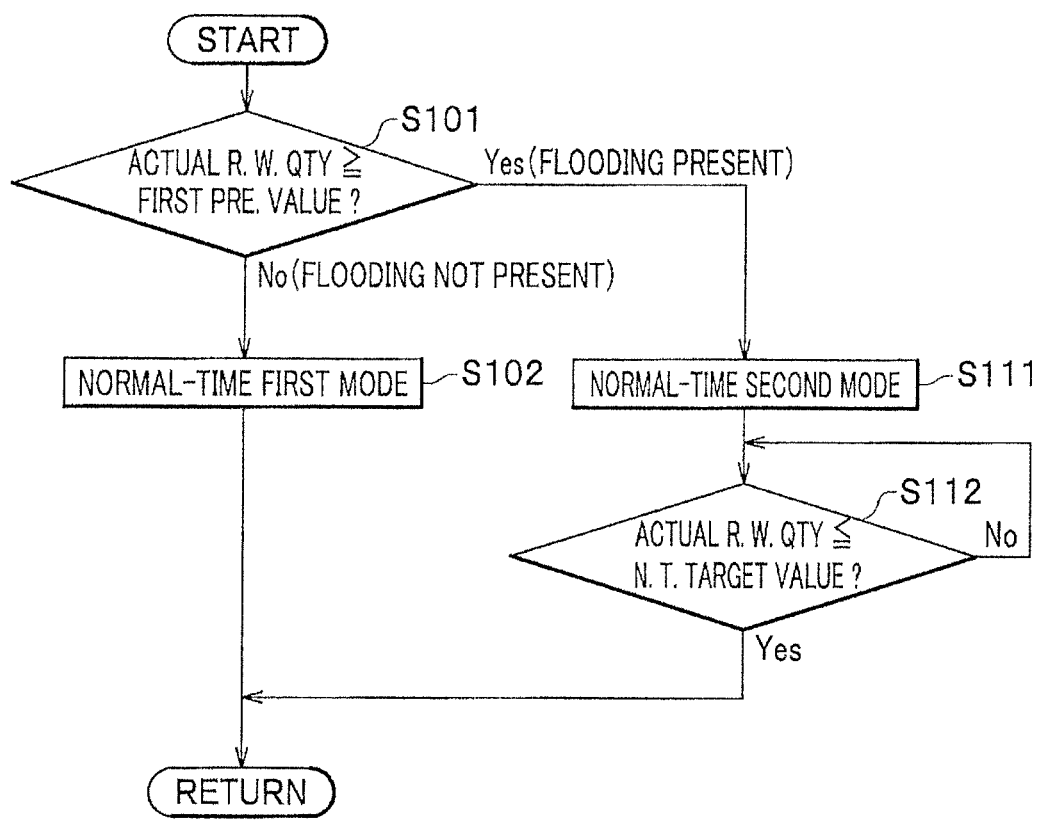
FIG. 2 is a flowchart representing a normal-time operation of the fuel cell system according to the present embodiment.

More specifically, the ECU 70 is adapted to determine that flooding is possibly generated (present), at the normal time during which the IG 61 continues to be turned on, when the retained water quantity is equal to or more than a first predetermined value (flooding threshold) (see FIG. 2, S101). Moreover, the ECU 70 is adapted to determine that flooding is possibly generated (present), at the stop time at which the OFF signal of the IG 61 is detected, when the retained water quantity is equal to or more than a second predetermined value (see FIG. 3, S201).

The first predetermined value and the second predetermined value are set to values at which determination is made that flooding is generated in the fuel cell stack 10 to interfere the supply of hydrogen and air and thus a power generation performance of the fuel cell stack 10 is decreased.

<ECU-Power Generation Controlling Function>

The ECU 70 (power generation control unit) has a function of operating the fuel cell system 1 in the normal-time first mode (normal-time mode), the normal-time second mode (normal-time drying mode), the stop-time first mode (stop-time mode), the stop-time second mode (stop-time drying mode) and the stop-time third mode (stop-time drying mode).

<Normal-Time First Mode and Normal-Time Second Mode>

The normal-time first mode and the normal-time second mode are modes which are selected at the normal time during which the IG 61 continues to be turned on.

<Normal-Time First Mode>

The normal-time first mode is a mode which is selected when flooding is not generated in the fuel cell stack 10 (see FIG. 2, S102). The normal-time first mode is a mode in which hydrogen and air are normally supplied in response to the accelerator opening degree and the fuel cell stack 10 is caused to normally generate electric power in response to the accelerator opening degree (required load).

Note that the normal-time first mode exhibits a relationship in which, with an increase in the accelerator opening degree, a target anode pressure and a target cathode pressure become high, a target anode gas flow rate (target hydrogen flow rate) and a target cathode gas flow rate (target air flow rate) become high, and a target output of the fuel cell stack 10 becomes large.

<Normal-Time Second Mode>

The normal-time second mode is a mode which is selected when flooding is generated in the fuel cell stack 10. The normal-time second mode is set such that retained water is discharged more than in the normal-time first mode because of generation of the flooding and thus drying of the fuel cell stack 10 is facilitated.

<Rise in Temperature of Fuel Cell Stack>

Specific methods of facilitating drying of the fuel cell stack 10 include, as one example, (1) a method of raising a temperature of the fuel cell stack 10 and vaporizing retained water to discharge it from the fuel cell stack 10.

Figure 5A:
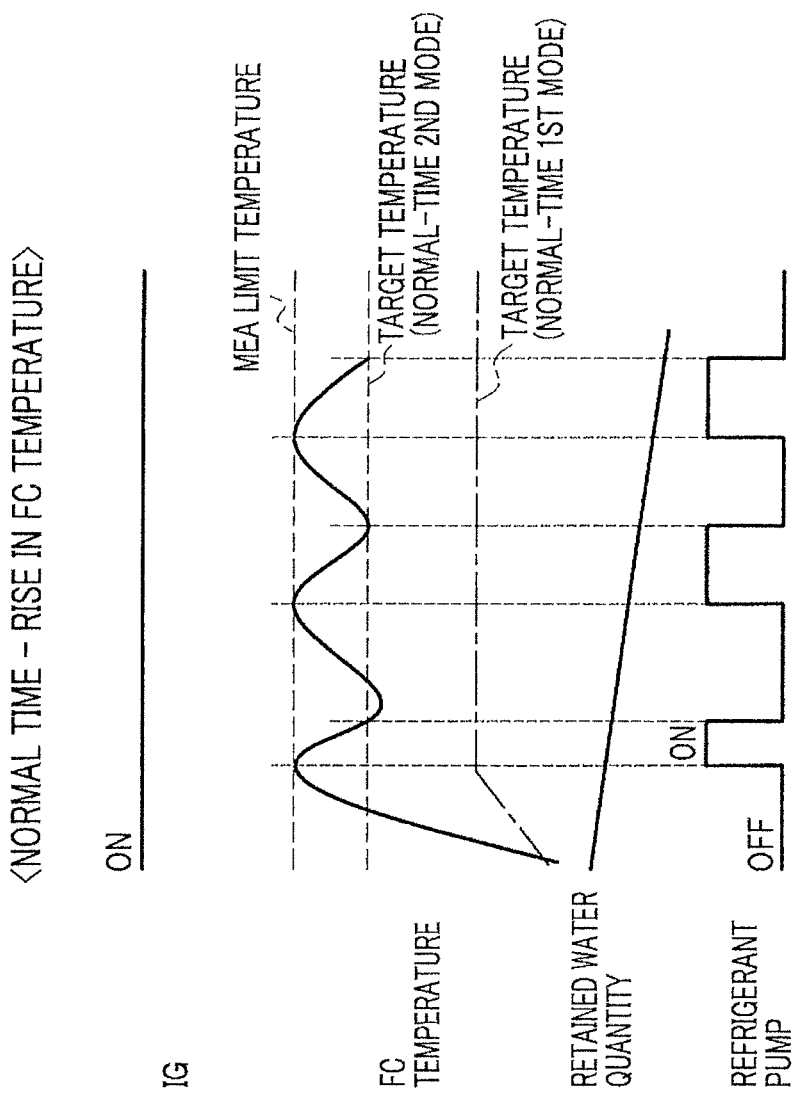

The temperature of the fuel cell stack 10 is raised by driving the refrigerant pump 41 intermittently to shorten the ON time or to stop the refrigerant pump 41 (see FIG. 5A, FIG. 5B). To be more specific, for example, ON/OFF operation of the refrigerant pump 41 is repeated by turning off the refrigerant pump 41 to raise a temperature of the fuel cell stack 10, turning on the refrigerant pump 41 when the temperature of the fuel cell stack 10 (temperature detected by a temperature sensor 44) reaches a limit temperature of the MEA (heat-resistant upper limit temperature), and turning off the refrigerant pump 41 when the temperature of the fuel cell stack 10 drops to a target temperature. The limit temperature of the MEA varies depending on the specification of the MEA (quality of material of the electrolyte membrane and the like) and is obtained based on tests in advance.

The target temperature of the normal-time first mode and the target temperature of the stop-time first mode are set to be nearly equal to each other. The target temperature of the normal-time second mode (e.g., 90 degrees Celsius) is set to a temperature which is higher than the target temperature of the normal-time first mode (e.g., 85 degrees Celsius) and at which retained water is easy to be vaporized.

Moreover, the target temperatures of the stop-time second mode and the stop-time third mode are set to be higher than the target temperature of the normal-time second mode. This allows retained water to be rapidly vaporized and drying of the fuel cell stack 10 to be facilitated at the stop time.

Furthermore, the temperature of the fuel cell stack 10 may be raised by providing a throttle valve in the pipe 41a and reducing an opening degree of the throttle valve (increasing a throttling quantity). Moreover, the temperature of the fuel cell stack 10 may be raised by increasing the output (current value) of the fuel cell stack 10 to increase self-generated heat with the power generation.

<Discharge of Retained Water in the Anode System>

Moreover, the above specific methods include (2) a method of discharging retained water in the internal anode passage 12 (see FIG. 6). More specifically, the purge valve 27 is continuously opened or the frequency of valve-opening of the purge valve 27 is increased to thereby increase the flow rate of anode gas (fuel gas) flowing through the internal anode passage 12 and rapidly discharge the retained water. Moreover, instead of or in addition to this method, the circulation pump 26 may be caused to be driven or the rotational speed thereof may be increased to thereby increase the flow rate and the pressure of anode gas. Furthermore, instead of or in addition to this method, the injection quantity of hydrogen by the injector 23 may be increased.

<Discharge of Retained Water in the Cathode System>

Figure 7A:
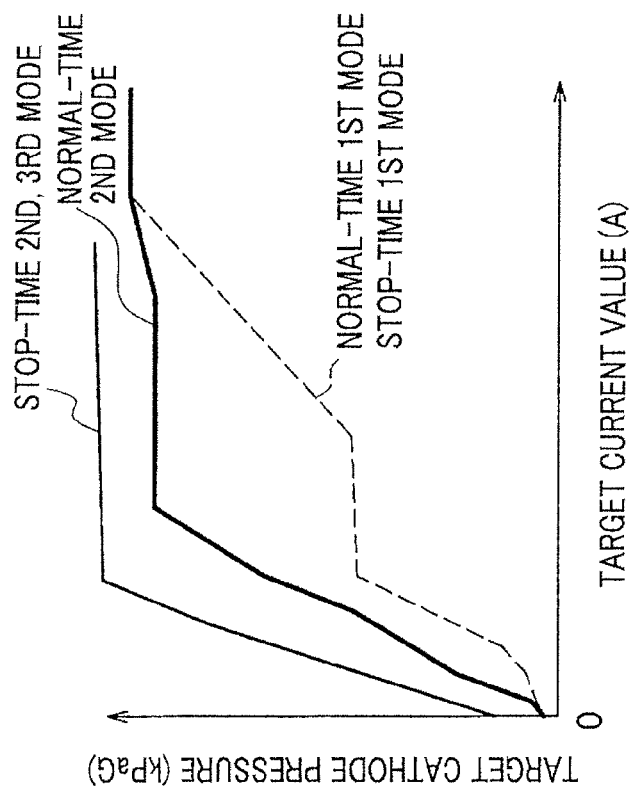
FIG. 7A is a map showing a relationship between a target current value and a target air flow rate.
Figure 7B:
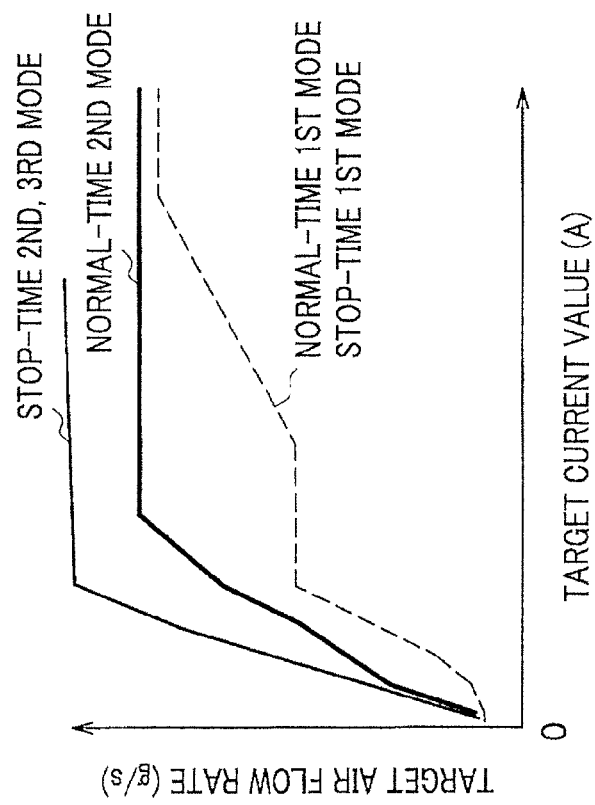
FIG. 7B is a map showing a relationship between a target current value and a target cathode pressure.
Figure 8A:
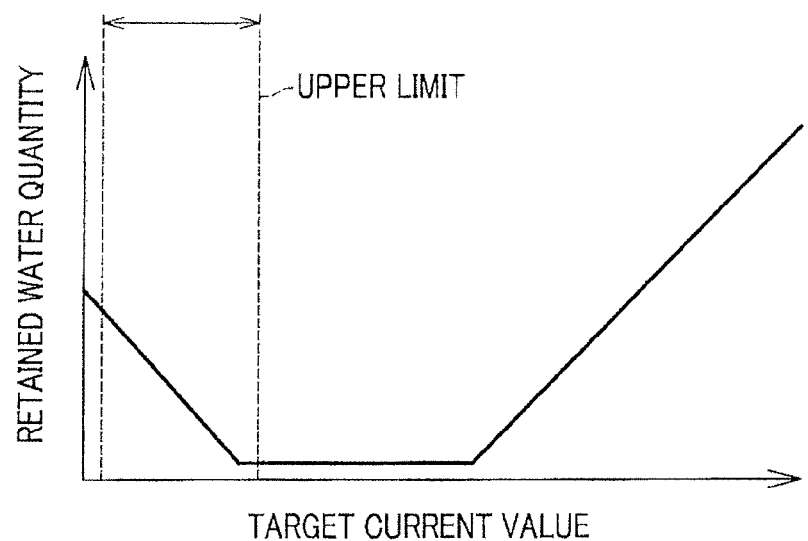
FIG. 8A is a map showing a relationship between a target current value and retained water.
Figure 8B:
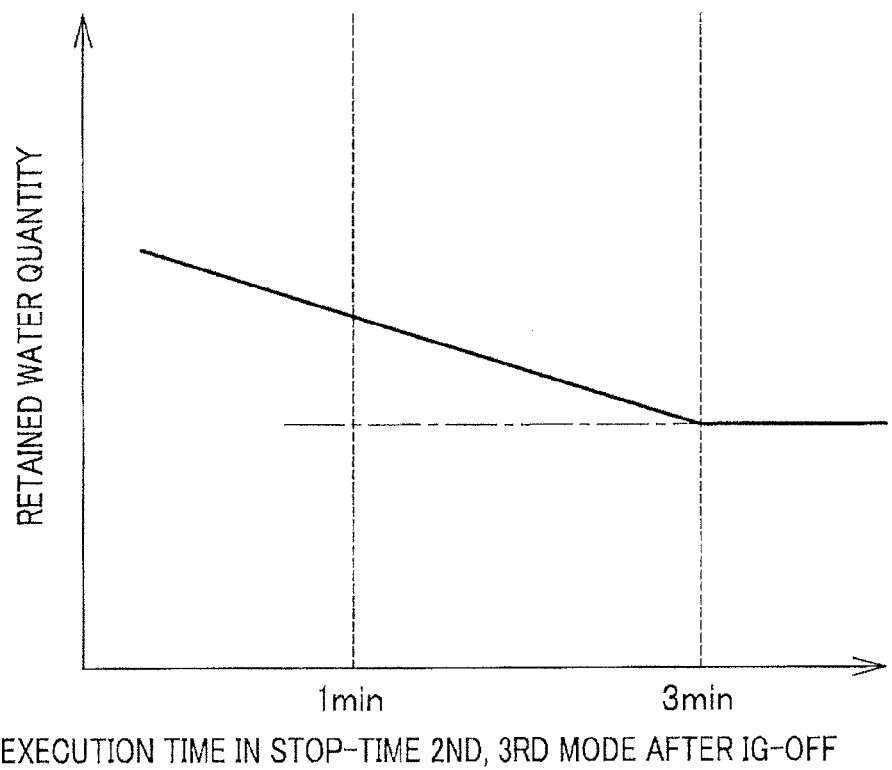
FIG. 8B is a timing chart showing a relationship between an execution time in the stop-time second, third mode after IG-OFF and retained water.

Moreover, the above specific methods include (3) a method of discharging retained water in the internal cathode passage 13 (see FIGS. 7A and 7B). More specifically, in order to increase the flow rate and the pressure of air flowing through the internal cathode passage 13, the rotational speed of the compressor 31 is increased while the opening degree of the back-pressure valve 34 is made small.

In this case, the target air flow rate (target cathode gas flow rate) is set to be increased according to the order of "the normal-time first mode, the stop-time first mode", "the normal-time second mode" and "the stop-time second mode, the stop-time third mode" (see FIG. 7A).

Moreover, the target cathode pressure is set to become high according to the order of "the normal-time first mode, the stop-time first mode", "the normal-time second mode" and "the stop-time second mode, the stop-time third mode" (see FIG. 7B).

<Decrease in Moisture Supplied>

Moreover, the above specific methods include (4) a method of decreasing moisture supplied (introduced) into the fuel cell stack 10. More specifically, the bypass valve 33 is opened and new air flows through the bypass valve 33 and bypasses the humidifier 32 to thereby decrease moisture supplied to the internal cathode passage 13.

Note that the methods of (1) to (4) described above may be employed alone, or may be employed in combination thereof.

<Stop-Time First Mode, Stop-Time Second Mode and Stop-Time Third Mode>

The stop-time first mode, the stop-time second mode and the stop-time third mode are modes which are selected at the system stop time at which an OFF signal of the IG 61 is detected to stop the fuel cell system 1.

<Stop-Time First Mode>

The stop-time first mode is a mode which is selected at the time of OFF of the IG 61 when flooding is not generated in the fuel cell stack 10 (see FIG. 3, S202). The stop-time first mode is set such that hydrogen and air are normally supplied to the fuel cell stack 10 because of flooding being not generated and thus the stop-time first mode is executed while maintaining the power generation of the fuel cell stack 10 until the quantity of retained water reaches a stop-time first target value.

In the stop-time first mode, the stop-time second mode and the stop-time third mode, the target current value of the fuel cell stack 10 is set to an upper limit of a range in which the fuel cell vehicle maintains its idle state (idling state) (range in which the power generation is possible in the idle state), namely, the maximum value of a stop-time current value, the stop-time current being consumable by auxiliaries (electric power consumption equipment) such as the compressor 31 in a vehicle stopped state of the fuel cell vehicle. Note that the target current value is not limited to the maximum value and may be set to the stop-time current value, the stop-time current being consumable by the auxiliaries.

Herein, the consumption of electric power by the auxiliaries includes, other than a form in which the compressor 31 and the like are driven to consume electric power, a form in which the battery 53 is charged to consume electric power. Moreover, the range in which the power generation is possible in the idle state is set, for example, based on electric power consumed by the compressor 31 and the like at a time of no-load (accelerator opening degree: 0), electric power which can be charged into the battery 53, and the like.

Thus by setting the stop-time current value to the upper limit, the self-generated heat of the fuel cell stack 10 is increased and the hydrogen flow rate and the air flow rate become high, thereby making the retained water easy to be discharged early.

<Stop-Time Second Mode>

The stop-time second mode is a mode which is selected at the time of OFF of the IG 61 when flooding is generated in the fuel cell stack 10 and a next actuation of the fuel cell system 1 is not a low-temperature actuation (is a normal actuation).

The low-temperature actuation is a mode in which warming-up of the fuel cell stack 10 is facilitated relative to the normal actuation by causing the fuel cell stack 10 to generate electric power with increased output while supplying hydrogen and air with high pressures and increased quantities to thereby increase self-generated heat with the power generation. Therefore, when the low-temperature actuation mode is executed, the output of the fuel cell stack 10 becomes high and accordingly the quantity of generated water generated with the power generation also becomes large.

Note that the ECU 70 (low-temperature actuation prediction unit) is adapted to predict that the next actuation is possibly a low-temperature actuation when determining that it is wintertime, for example, based on an ambient temperature at the stop time of the fuel cell system 1, location information on the vehicle obtained from GPS information, weather information or calendar information.

Moreover, the ECU 70 can also predict that the next actuation is a low-temperature actuation when predicting that a next actuation temperature is equal to or lower than a predetermined temperature. Note that prediction of the next actuation temperature can be carried out, for example, using any one of the ambient temperature, the calendar information and the GPS information. The ambient temperature is, for example, an atmospheric temperature outside the vehicle at the system stop time (at the moment), and can be detected by an ambient temperature sensor (not shown). The calendar information includes a current date, day of the week, time and the like, and for example, the presence or absence of freezing can be determined based on the season (e.g., summertime or wintertime). The GPS information includes, for example, information (e.g., longitude, latitude) sent from artificial satellites for the GPS and for example, the self-vehicle position (e.g., Okinawa or Hokkaido) is calculated based on information calculated by a car navigation system installed in the vehicle.

Moreover, the next actuation temperature may be predicted using a combination of two or more of the ambient temperature, the calendar information and the GPS information. Furthermore, as the other means for predicting the next actuation temperature, the next actuation temperature may be predicted based on the past operation patterns, or may be predicted based on meteorological information.

The stop-time second mode is set such that discharge of the retained water is facilitated and drying of the fuel cell stack 10 is facilitated relative to the stop-time first mode. To be more specific, the methods of (1) to (4) described above may be employed alone, or may be employed in combination thereof.

The stop-time second mode is set to be executed until the quantity of retained water reaches a stop-time second target value. The stop-time second target value is set to be smaller than the stop-time first target value (stop-time second target value<stop-time first target value).

Moreover, execution time in the stop-time second mode and the stop-time third mode can be set to a predetermined time (for example, 3 minutes, see FIG. 8B) obtained based on tests or the like in advance. This is because, with prolongation of the execution time in the stop-time second mode and the stop-time third mode, the quantity of retained water does not become zero, but tends to converge on a predetermined quantity of retained water more than zero.

<Stop-Time Third Mode>

The stop-time third mode is a mode which is selected at the time of OFF of the IG 61 when flooding is generated in the fuel cell stack 10 and a next actuation of the fuel cell system 1 is a low-temperature actuation.

The stop-time third mode is set such that discharge of the retained water is facilitated and drying of the fuel cell stack 10 is facilitated relative to the stop-time second mode. To be more specific, the methods of (1) to (4) described above may be employed alone, or may be employed in combination thereof.

The stop-time third mode is set to be executed until the quantity of retained water reaches a stop-time third target value. The stop-time third target value is set to be smaller than the stop-time second target value (stop-time third target value<stop-time second target value). Namely, a target moisture quantity (stop-time third target value) when determining that the next system actuation is a low-temperature actuation at the time of detection of the OFF signal (system stop instruction) of the IG 61 is set to be smaller than a target moisture quantity (stop-time second target value) when determining that the next system actuation is not a low-temperature actuation.

Note that the stop-time first target value, the stop-time second target value and the stop-time third target value have such a relationship as to become small in this order (stop-time first target value>stop-time second target value>stop-time third target value).

The stop-time second target value and the stop-time third target value (see FIG. 3) are set to be smaller than a normal-time target value (see FIG. 2) (normal-time target value>stop-time second target value>stop-time third target value). Namely, a target moisture quantity (stop-time second target value, stop-time third target value) in the stop-time drying mode (stop-time second mode, stop-time third mode) is smaller than a target moisture quantity (normal-time target value) in the normal-time drying mode (normal-time second mode).

<<Operation of Fuel Cell System>>

Next, a description will be given of an operation of the fuel cell system 1.

<<Normal Time>>

With reference to FIG. 2, a description will be given of an operation at the normal time during which the IG 61 continues to be turned on and the fuel cell system 1 normally operates.

At step S101, the ECU 70 determines whether or not the actual retained water quantity is equal to or more than the first predetermined value.

When the ECU 70 determines that the actual retained water quantity is equal to or more than the first predetermined value (S101, Yes), the processing of the ECU 70 proceeds to step S111. When the processing thus proceeds to step S111, the ECU 70 determines that flooding is possibly generated (present) in the fuel cell stack 10.

When the ECU 70 determines that the actual retained water quantity is not equal to or more than the first predetermined value (S101, No), the processing of the ECU 70 proceeds to step S102. When the processing thus proceeds to step S102, the ECU 70 determines that flooding is not possibly generated (not present) in the fuel cell stack 10.

<Normal-Time First Mode>

At step S102, the ECU 70 operates the fuel cell system 1 in the normal-time first mode.

Thereafter, the processing of the ECU 70 returns to "START" through "RETURN".

<Normal-Time Second Mode>

At step S111, the ECU 70 operates the fuel cell system 1 in the normal-time second mode. This allows drying of the fuel cell stack 10 to be facilitated relative to the normal-time first mode.

At step S112, the ECU 70 determines whether or not the actual retained water quantity is equal to or less than the normal-time target value.

When the ECU 70 determines that the actual retained water quantity is equal to or less than the normal-time target value (S112, Yes), the processing of the ECU 70 proceeds to "RETURN". When the processing thus proceeds to "RETURN", the ECU 70 determines that the drying of the fuel cell stack 10 is advanced and the flooding is eliminated.

When the ECU 70 determines that the actual retained water quantity is not equal to or less than the normal-time target value (S112, No), the ECU 70 repeats the processing of step S112. Namely, the operation in the normal-time second mode is maintained until the actual retained water quantity becomes equal to or less than the normal-time target value.

<<Stop Time>>

With reference to FIG. 3, a description will be given of an operation at the stop time at which the IG 61 is turned off and the fuel cell system 1 stops. Note that when the IG 61 is turned off and the ECU 70 detects the OFF signal (system stop instruction) of the IG 61, the processing of FIG. 3 starts.

At step S201, the ECU 70 determines whether or not the actual retained water quantity is equal to or more than the second predetermined value. The second predetermined value is set to be equal to or less than the first predetermined value at step S101.

When the ECU 70 determines that the actual retained water quantity is equal to or more than the second predetermined value (S201, Yes), the processing of the ECU 70 proceeds to step S211. When the processing thus proceeds to step S211, the ECU 70 determines that flooding is possibly generated (present) in the fuel cell stack 10.

When the ECU 70 determines that the actual retained water quantity is not equal to or more than the second predetermined value (S201, No), the processing of the ECU 70 proceeds to step S202. When the processing thus proceeds to step S202, the ECU 70 determines that flooding is not possibly generated (not present) in the fuel cell stack 10.

<Stop-Time First Mode>

At step S202, the ECU 70 operates the fuel cell system 1 in the stop-time first mode.

Note that an alternative process may be adopted in which step S202 (stop-time first mode) and step S203 are omitted and after step S201, No, the processing proceeds to step S204.

At step S203, the ECU 70 determines whether or not the actual retained water quantity is equal to or less than the stop-time first target value.

When the ECU 70 determines that the actual retained water quantity is equal to or less than the stop-time first target value (S203, Yes), the processing of the ECU 70 proceeds to step S204. When the processing thus proceeds to step S204, the ECU 70 determines that the drying of the fuel cell stack 10 is advanced and the flooding is eliminated.

When the ECU 70 determines that the actual retained water quantity is not equal to or less than the stop-time first target value (S203, No), the ECU 70 repeats the processing of step S203. Namely, the operation in the stop-time first mode is maintained until the actual retained water quantity becomes equal to or less than the stop-time first target value.

At step S204, the ECU 70 stops power generation of the fuel cell stack 10.

More specifically, the ECU 70 closes the shutoff valve 22, stops the circulation pump 26, the compressor 31 and the refrigerant pump 41, and then controls the electric power controller 52 to cause electric power generated by the fuel cell stack 10 to be 0 (W).

Thereafter, the processing of the ECU 70 proceeds to "END".

At step S211, the ECU 70 determines whether or not the next actuation of the fuel cell system 1 is a low-temperature actuation.

When the ECU 70 determines that the next actuation is a low-temperature actuation (S211, Yes), the processing of the ECU 70 proceeds to step S214.

When the ECU 70 determines that the next actuation is not a low-temperature actuation (S211, No), the processing of the ECU 70 proceeds to step S212.

<Stop-Time Second Mode>

At step S212, the ECU 70 operates the fuel cell system 1 in the stop-time second mode.

At step S213, the ECU 70 determines whether or not the actual retained water quantity is equal to or less than the stop-time second target value.

When the ECU 70 determines that the actual retained water quantity is equal to or less than the stop-time second target value (S213, Yes), the processing of the ECU 70 proceeds to step S204. When the processing thus proceeds to step S204, the ECU 70 determines that the drying of the fuel cell stack 10 is advanced and the flooding is eliminated.

When the ECU 70 determines that the actual retained water quantity is not equal to or less than the stop-time second target value (S213, No), the ECU 70 repeats the processing of step S213. Namely, the operation in the stop-time second mode is maintained until the actual retained water quantity becomes equal to or less than the stop-time second target value.

<Stop-Time Third Mode>

At step S214, the ECU 70 operates the fuel cell system 1 in the stop-time third mode.

At step S215, the ECU 70 determines whether or not the actual retained water quantity is equal to or less than the stop-time third target value.

When the ECU 70 determines that the actual retained water quantity is equal to or less than the stop-time third target value (S215, Yes), the processing of the ECU 70 proceeds to step S204. When the processing thus proceeds to step S204, the ECU 70 determines that the drying of the fuel cell stack 10 is advanced and the flooding is eliminated.

When the ECU 70 determines that the actual retained water quantity is not equal to or less than the stop-time third target value (S215, No), the ECU 70 repeats the processing of step S215. Namely, the operation in the stop-time third mode is maintained until the actual retained water quantity becomes equal to or less than the stop-time third target value.

<<Advantageous Effects of Fuel Cell System>>

According to the fuel cell system 1, the following advantageous effects are obtained.

As shown in FIG. 9, in the case where the IG 61 is turned off during power generation under high load, when a determination that flooding is possibly generated is made (FIG. 3, S201, Yes), the system is operated in the stop-time second mode or the stop-time third mode to continue the power generation of the fuel cell stack 10, thereby making it possible to rapidly discharge the retained water. Namely, with a simple configuration not equipped with a scavenging gas supply pump or the like, it is possible to decrease the retained water by continuing the power generation of the fuel cell stack 10 after the IG 61 is turned off. This prevents the fuel cell stack 10 from freezing during the system stop. Moreover, when the system is actuated next time, warming-up of the fuel cell stack 10 is never delayed.

Moreover, the same also applies to the case where the IG 61 is turned off during warming-up of the fuel cell stack 10 at a start-up time of the system and a determination that flooding is possibly generated is made (FIG. 3, S201, Yes). Note that during the warming-up of the fuel cell stack 10, since the output of the fuel cell stack 10 is increased to increase self-generated heat with the power generation, retained water is apt to be increased.

<<Modifications>>

Although one embodiment of the present invention has been described hereinbefore, the present invention is not limited to this embodiment and may be modified, for example, as follows.

Although the above embodiment exemplifies the fuel cell system 1 mounted on the fuel cell vehicle, the form of application is not limited to this embodiment. For example, a configuration may be adopted in which the system is installed in a stationary fuel cell system.

Although the above embodiment exemplifies the configuration in which the ECU 70 (retained water quantity grasping unit) integrates the increment of retained water (Δg/sec) with respect to time to thereby calculate (estimate) the current quantity of retained water contained in the fuel cell stack 10, an alternative configuration may be adopted. For example, a configuration may be adopted in which an actual retained water quantity retained in the internal anode passage 12 is detected based on a humidity detected by a humidity sensor that is provided in the internal anode passage 12, and a volume (cubic content) of the internal anode passage 12, namely, by multiplying the humidity by the volume (cubic content) of the internal anode passage 12. The same also applies to a configuration in which an actual retained water quantity retained in the internal cathode passage 13 is detected.

Although the above embodiment exemplifies the configuration in which the ECU 70 (retained water quantity grasping unit) estimates or calculates the quantity of retained water contained in the fuel cell stack 10, a further configuration may be added thereto. For example, a configuration may be adopted in which the ECU 70 (retained water quantity grasping unit) detects or estimates a quantity of anode system retained water retained in the anode system, and when a determination that a large quantity of water is retained in the anode system is made based on the quantity of anode system retained water, the ECU 70 (power generation control unit) executes the normal-time second mode (normal-time drying mode), or the stop-time second mode and the stop-time third mode (stop-time drying mode). In this configuration, a method of detecting the quantity of anode system retained water, and a method of determining whether or not a large quantity of water is retained in the anode system, are the same as those in the above embodiment.

DESCRIPTION OF REFERENCE SIGNS

1 Fuel cell system
10 Fuel cell stack (Fuel cells)
11 Single cell (Fuel cell)
12 Internal anode passage (Internal reactant gas passage)
13 Internal cathode passage (Internal reactant gas passage)
21a, 22a, 23a, 24a pipe (Fuel gas supply passage)
23 Injector (Circulation quantity control unit)
25a, 25b, 26a Pipe (Fuel gas circulation passage)
26 Circulation pump (Circulation quantity control unit)
27 Purge valve (Discharge valve)
27a Pipe (Fuel gas discharge passage)
52 Electric power controller (Power generation control unit)
61 IG
70 ECU (Retained water quantity grasping unit, Power generation control unit)

What is claimed is:

1. A control method for a fuel cell system equipped with: a fuel cell that has a membrane electrode assembly which includes an electrolyte membrane, and an internal reactant gas passage through which reactant gas supplied to and discharged from the membrane electrode assembly flows; a retained water quantity grasping unit that detects or estimates an actual retained water quantity which is a current quantity of retained water retained in the internal reactant gas passage; and a power generation control unit that controls power generation of the fuel cell, the control method comprising:
a step of, when the actual retained water quantity is equal to or more than a flooding threshold, by means of the power generation control unit, causing the system to be actuated in a normal-time drying mode in which the fuel cell is caused to generate electric power while being dried more than in a normal-time mode in which the fuel cell is caused to normally generate electric power in response to a required load, until the actual retained water quantity is decreased to a normal-time target retained water quantity; and
a step of, when the actual retained water quantity is equal to or more than the flooding threshold at a time of detection of a system stop instruction, by means of the power generation control unit, causing the system to be actuated in a stop-time drying mode in which the fuel cell is caused to generate electric power while being dried more than in the normal-time drying mode until the actual retained water quantity is decreased to a stop-time target retained water quantity that is set to be smaller than the normal-time target retained water quantity.

2. The control method for a fuel cell system, according to claim 1, further comprising a step of, by means of the power generation control unit, raising a temperature of the fuel cell in the stop-time drying mode to be higher than in the normal-time drying mode.

3. The control method for a fuel cell system, according to claim 1, further comprising a step of, by means of the power generation control unit, increasing a pressure of oxidant gas which flows through the fuel cell in the stop-time drying mode to be higher than in the normal-time drying mode.

4. The control method for a fuel cell system, according to claim 1, further comprising a step of, by means of the power generation control unit, increasing a flow rate of oxidant gas which flows through the fuel cell in the stop-time drying mode to be higher than in the normal-time drying mode.

5. The control method for a fuel cell system, according to claim 1, wherein the fuel cell system further comprises a fuel gas circulation passage which allows fuel gas discharged from the fuel cell to circulate therethrough, and a circulation quantity control unit that controls circulation quantity of the fuel gas circulating through the fuel gas circulation passage,
the control method further comprising a step of, by means of the power generation control unit, causing the circulation quantity control unit to increase circulation quantity of the fuel gas in the normal-time drying mode and the stop-time drying mode.

6. The control method for a fuel cell system, according to claim 1, further comprising a step of, by means of the power generation control unit, increasing a flow rate of fuel gas which flows through the fuel cell in the normal-time drying mode and the stop-time drying mode.

7. The control method for a fuel cell system, according to claim 1, further comprising a step of, by means of the power generation control unit, setting a current value of the fuel cell in the stop-time drying mode to a stop-time current value, the stop-time current being consumable in a stopped state of a vehicle.

8. The control method for a fuel cell system, according to claim 1, wherein a target moisture quantity that is set when detecting a system stop instructions and predicting that a next actuation of the system is a low-temperature actuation is smaller than a target moisture quantity that is set when detecting the system stop instructions and predicting that the next actuation of the system is not a low-temperature actuation.

9. The control method for a fuel cell system, according to claim 1, wherein the fuel cell system further comprises an anode system that includes a fuel gas storage unit in which fuel gas is stored, a fuel gas supply passage through which fuel gas flows from the fuel gas storage unit toward the fuel cell, a fuel gas discharge passage through which fuel gas from the fuel cell flows, a fuel gas circulation passage which connects the fuel gas supply passage and the fuel gas discharge passage to each other and allows fuel gas to circulate therethrough, and a discharge valve which discharges gas in the fuel gas discharge passage to an outside of the system, the control method further comprising:

a step of, by means of the retained water quantity grasping unit, detecting or estimating a quantity of anode system retained water retained in the anode system; and a step of, when a determination that the quantity of anode system retained water is equal to or more than the flooding threshold is made, by means of the power generation control unit, causing the system to be actuated in the normal-time drying mode or the stop-time drying mode.

* * * * *